(12) United States Patent
Zhang et al.

(10) Patent No.: US 7,265,196 B2
(45) Date of Patent: Sep. 4, 2007

(54) CONTROLLED CROSSLINKED POLYARYLETHERKETONE MATERIAL WITH IMPROVED PROPERTIES AND A PROCESS BY PRODUCING THE SAME

(75) Inventors: Wanjin Zhang, Changchun (CN); Chunhai Chen, Changchun (CN); Xincai Liu, Changchun (CN); Xiaogang Zhao, Changchun (CN); Youhai Yu, Changchun (CN); Zihong Gao, Changchun (CN); Xiaoqing Yang, Changchun (CN); Zhongwen Wu, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 10/886,193

(22) Filed: Jul. 7, 2004

(65) Prior Publication Data
US 2005/0010015 A1    Jan. 13, 2005

(30) Foreign Application Priority Data
Jul. 8, 2003  (CN) ................. 03 1 27615

(51) Int. Cl.
*C08G 8/02* (2006.01)
*C08G 14/60* (2006.01)

(52) U.S. Cl. .................. 528/125; 528/196; 528/205; 528/229; 528/381; 528/397; 528/488

(58) Field of Classification Search ............... 525/125, 525/196, 205, 219, 381, 397, 488
See application file for complete search history.

(56) References Cited

FOREIGN PATENT DOCUMENTS

CN    ZL00105146.6    1/2003

OTHER PUBLICATIONS

Liu et al, Effect of corsslinking point—poly(etheretherketones), Polymer Preprints (American Chemical Society, Division of Polymer Chemistry), 44(1), 123-124 (English) 2002, Chem Abstract 138:402242.*
Liu et al, Synthesis and thermal properties—poly(etheretherketones), Gaodeng Jiaoyu Chubanshe, 23(90, 1817-1819 (Chinese) 2002, Chem Abstract 138: 25225.*
Liu et al, Rheological evidence—poly(arylether ketone)s, Polymer Preprints (American Chemical Society, Division of Polymer Chemistry), 43(2), 1288-1289 (English) 2002, Chem Abstract 137: 263660.*
Liu et al, Synthesis and characterization—poly(etheretherketone), Polymer Preprints (American Chemical Society, Division of Polymer Chemistry), 42(1), 530-531 (English) 2001, Chem Abstract 135: 20017.*
Liu et al, Preparation high performance polyaryleether ketones, Jilin Univ.., Peop. Rep. China, 2000, Chem Abstract 134:266722.*
Zhou, H.W. et al. (1999) "Synthesis and thermal properties of poly (aryl ether ketone)s containing dibenzoylbiphenyl moieties copolymer" *Polymer Preprints* (J), 40:203-204.
Zhou, H.W. et al. (1999) "Research on the molecular design and chain structure of PAEK and the structure of condensed phase" *Doctoral Dissertation (Jilin University)*, Abstract in 1 page.

* cited by examiner

*Primary Examiner*—Duc Truong
(74) *Attorney, Agent, or Firm*—Knobbe, Martens, Olson & Bear, LLP

(57) ABSTRACT

The present invention relates to a controllable crosslinking polyaryletherketone with improved properties such as stiffness, heat resistance, and stability as shown by any one of the following structures:

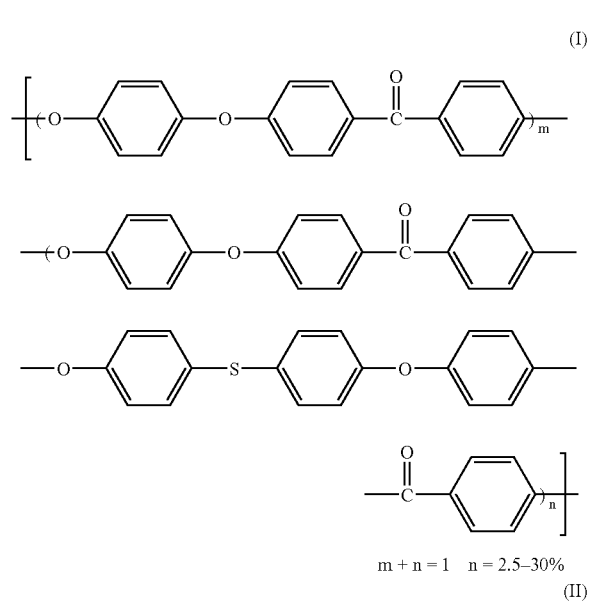
(I)
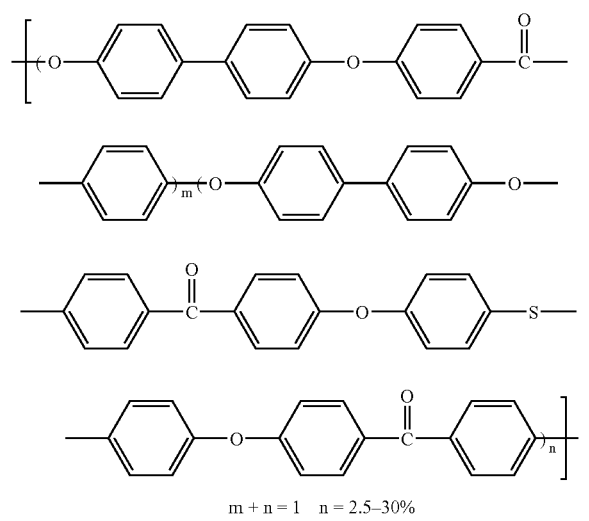
(II)
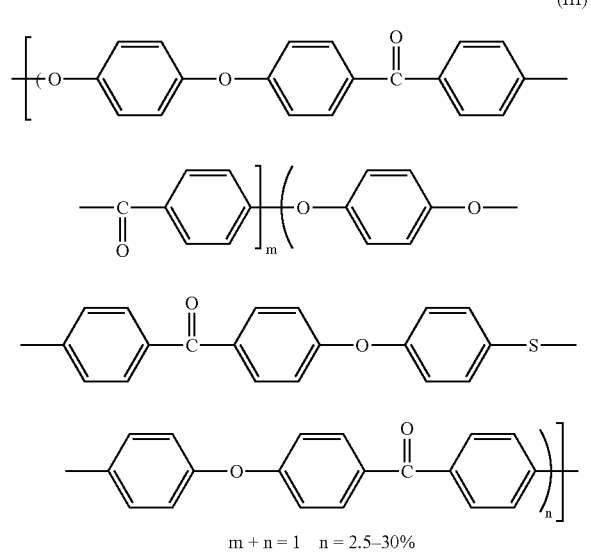
(III)
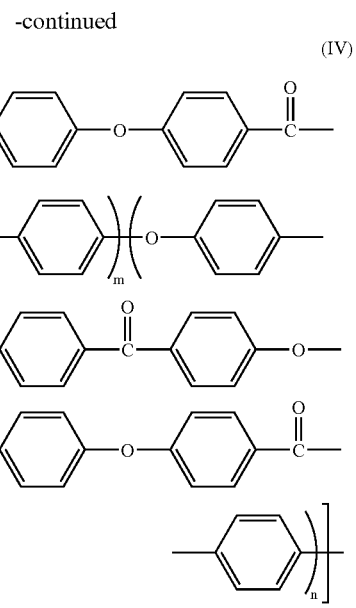
(IV)
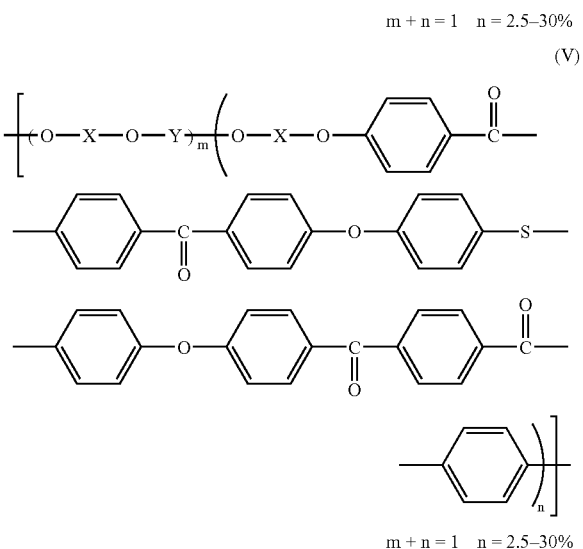
(V)
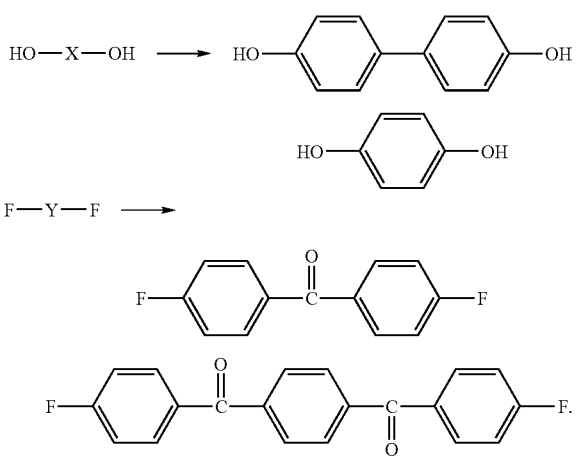
2 Claims, 3 Drawing Sheets

CONTROLLED CROSSLINKED POLYARYLETHERKETONE MATERIAL WITH IMPROVED PROPERTIES AND A PROCESS BY PRODUCING THE SAME

RELATED APPLICATIONS

This application claims the benefit of priority of Chinese Patent Application No. 03127615.6, filed on Jul. 8, 2003.

FIELD OF THE INVENTION

This invention relates to a polymer material, particularly, to a novel controllable crosslinking polyaryletherketone (hereinafter referred as to PAEK) material with improved performance and a process for preparing the same.

BACKGROUND OF THE INVENTION

Polyetheretherketone (PEEK), successfully developed and commercialized first by Imperial Chemical Industries, Ltd., England, has been used widely in many high-tech fields owing to its excellent comprehensive property. However, PEEK material itself has many disadvantageous: rapid drop in material modulus at high temperature caused by the low glass transition temperature and low application temperature (application temperature for long, ≦240° C.) caused by the low melting point, which greatly limit the range of application. In order to further raise the application temperature of polyaryletherketone material which is a critical material for reforming conventional industry, thereby satisfying the increasing demands on the heat resistance in advanced technical field, such as new energy, nuclear technology, space development, ocean engineering and the like. Many attempts have been made by the scientific research personnels. Firstly, PEEK has been blended with other high-performance materials such as polysulfone (PSF), polyether sulfone (PES), Polyimide (PAI), polyether amide (PEI), polyphenylene sulfide (PPS), polyetherketone (PEK) and so on to obtain a composite material. But phase separation exists in these composite materials and influences the mechanical performance and application of the materials. Next, a stiff structure has been introduced into the main chain of PAEK and the glass transition temperature (Tg) and melting point (Tm) have been raised so as to raise the application temperature of PAEK. New sorts of polymers, such as polyetheretherketoneketone (PEEKK), polyetherdiphenyletherketone (PEDEK), and polyetherdiphenyletherketoneketone (PEDEKK) have been presented in succession to satisfy the urgent needs of some sophisticated techniques. However, the difficulties in processing grow up with the continual increase in Tg and Tm. Recently, the Tm of a new sort of PAEK, developed successfully by the inventors, has reached 469° C., see reference 1 (Zhou H. W., Chen C. H., Wu Z. W. et al., Polymer Preprints [J], 1999, 40(1):203-204) and reference 2 (Zhou H. W., Doctoral Dissertation (Jilin Univ), 1999 "Research on the molecular design and chain structure of PAEK and the structure of condensed phase"). The PAEK material having a very high melting point, theoretically having the application temperature rasied up to 350° C., thus it is very difficult to be put into practice. The most major reason lies in the fact that it is very difficult to form this material into a practicable product. So the method of raising the Tg and Tm of PAIK to raise the application temperature has an obvious disadvantage. In addition, an attempt has been made to introduce a cross-linking point into the PAEK material thereby forming a cross-linked structure to obtain a high-performance material. But a degradation reaction takes place at the selected cross-linking point during the cross-linking reaction and causes the deterioration of the material performance. As a result, the desired result is not achieved.

Polymer materials can be classified into two types: thermoplastic materials and thermosetting materials. These two types of materials respectively have respective strong and weak points: the former has excellent processability and low application temperature, and the latter has high application temperature but is somewhat difficult to be formed into a cast piece having fixed dimension and shape. It is desired to develop a material exhibiting excellent material performances and processing properties by combining the excellent processability of the thermoplastic material with the excellent heat performance of the thermosetting material. It is the hot spot of research and development for the next generation material exhibiting high performance.

Therefore, in respect to the molecular design of PAEK, the strong points of the two types of materials are considered to combine into one material so that both the excellent processability of the thermoplastic material and the excellent heat resistance of the thermosetting material are fully utilized. Based on this design, the present inventors incorporated the thioether structure, which is capable of being subjected to a cross-linking reaction at high temperature or radiation conditions, into the main chain of PAEK as a cross-linking point. No degradation reaction takes place and no small molecules are produced during the cross-linking reaction. After a cross-linked network structure is formed, a high-performance thermosetting material having stable polymer molecular structure and performance can be obtained. In the process of preparation, the segment length between adjacent cross-linking points is made to be basically the same by regulating and controlling the regular distribution of the thioether structure in the PAEK segments by way of block copolymerization. In this way, the uniform distribution of the cross-linking points in the polymer segments is achieved. In addition, a series of controllable cross-linking PAEK can be prepared by changing the ratio of monomers in the polymerization process, to regulate and control the content of thioether structure in polymer segment. The mol percent is controlled in the range of 2.5%-30%. The material performance can be controlled and regulated by controlling and regulating the cross-linking density so as to achieve the object of controlling the material performance of the cross-linked PAEK and satisfying the different application requirements. Combining the excellent characteristics of the thermoplastic and thermosetting resin matrix, without increasing production cost, not only can solve the problem of low heat resistance of thermoplastic resin matrix but also can avoid the disadvantage of poor processability of thermosetting resin matrix. The material can be used at a temperature up to 350° C. It is great significant to develop a PAEK material with improved performance.

SUMMARY OF THE INVENTION

The object of this invention is to provide a new type controllable cross-linking polyaryletherketone material with improved performance capable of satisfying different application requirements.

Another object of the present invention is to provide a process for preparing the above material.

The above objects can be achieved by introducing thioether structure into PAEK segment with excellent processablility, and cross-linking thioether in a controlled cross-linking density by heat cross-linking or electron beam radiation to increase the application temperature and improve the material performance.

DETAILED DESCRIPTION OF THE PREFERRED EMBODIMENT

Figure 1:
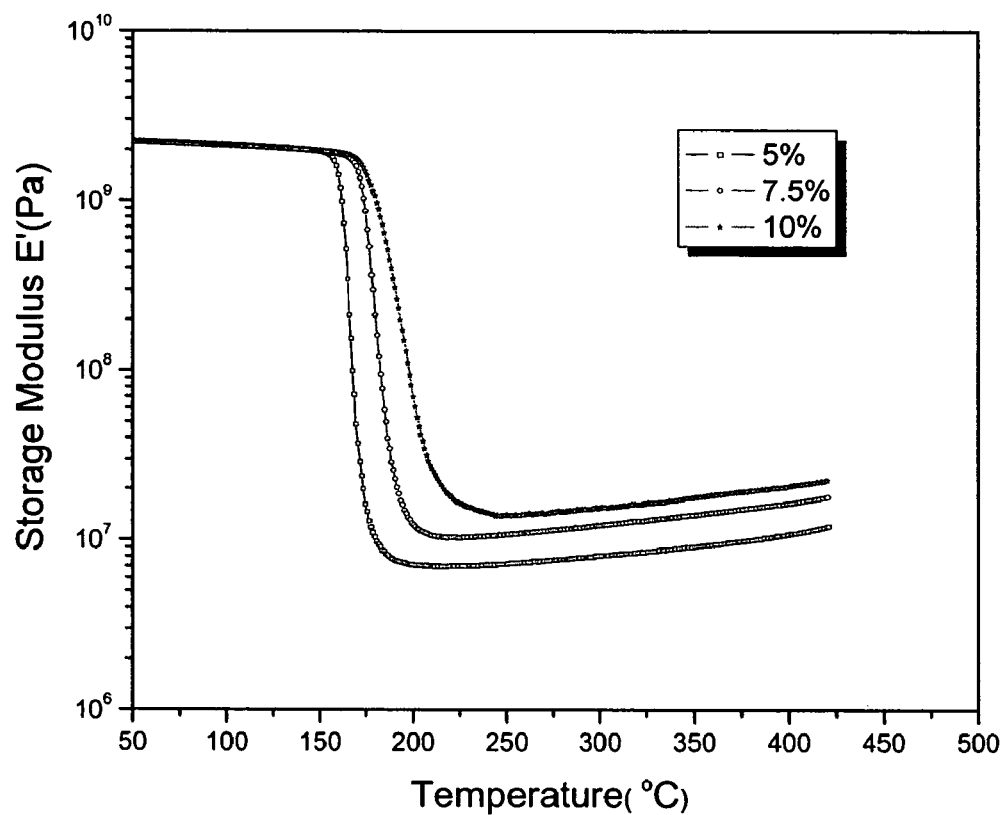
FIG. 1 shows overlay curves of storage modulus versus temperature of the block copolymers with 5%, 7.5% and 10% of cross-linking points (FKOSOKF) annealed for 6 hr under nitrogen atmosphere at 380° C.
Figure 2:
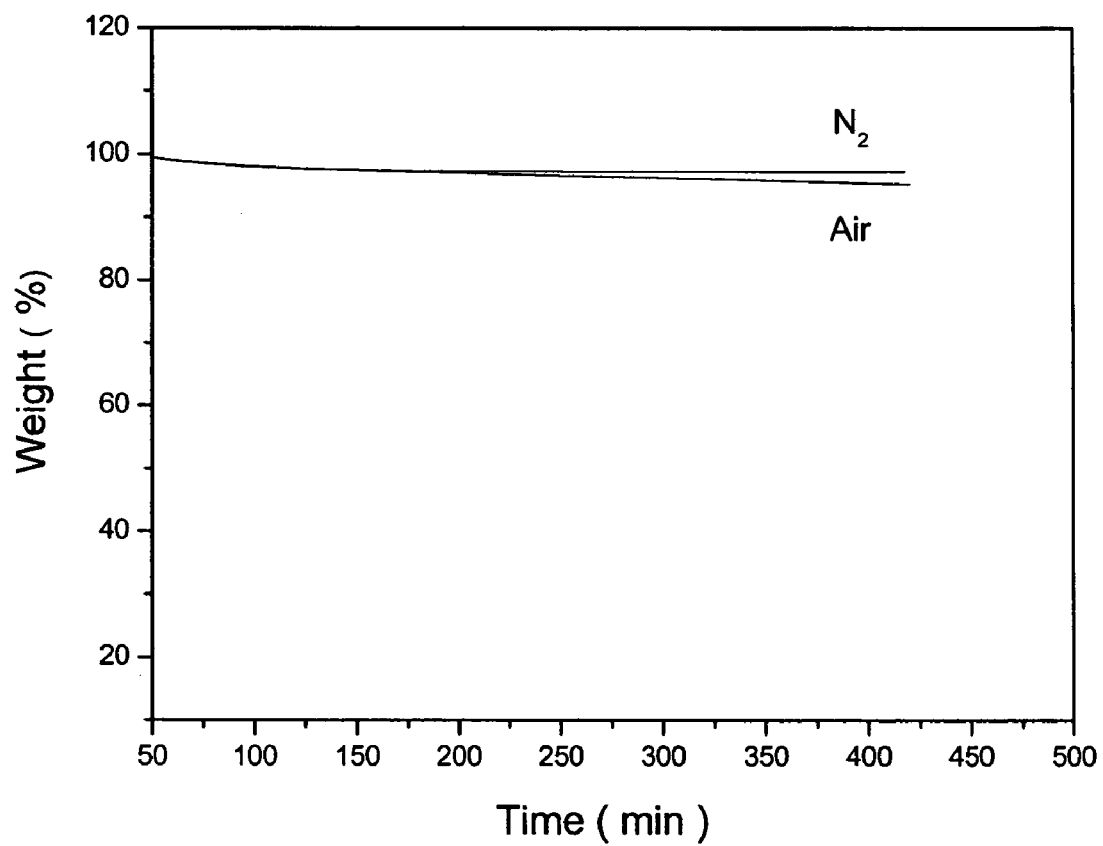
FIG. 2 shows TGA thermograms of the present block copolymers with 5% of cross-linking points (FKOSOKF, example 2) obtained by scanning for 7 hr under a gas atmosphere other than nitrogen atmosphere at 380° C.
Figure 3:
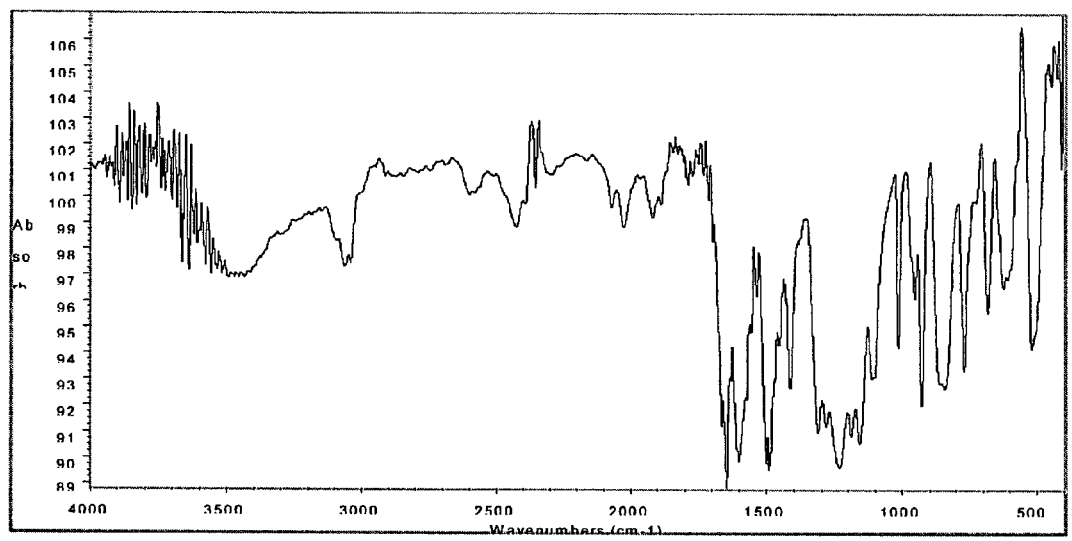
FIG. 3 shows an IR spectrum of the present block copolymers with 5% of cross-linking points (FKOSOKF, example 2).

Chinese Patent No. ZL00,105,146.6, which is fully incorporated herein as a part of the present application, discloses a synthetic method of the monomer 4-(4-{4-[4-(4-fluoro-benzoyl) -phenoxy]-phenylsulfanyl}-phenoxy)-phenyl]-(4-fluoro-phenyl)-methanone (hereinafter referred as to FKOSOKF).

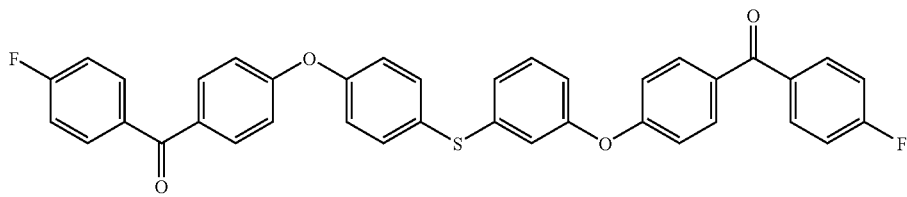

STRUCTURE OF FKOSOKF

The method for preparing a new monomer 4-{4-[4-(3-{4-[4-(4-fluoro-benzoyl)-benzoyl]-phenoxy}-phenylsulfanyl)-benzoyl}-phenyl]-(4-fluoro-phenyl)-methanone (hereinafter referred as to FKKOSOKKF) from bis(4-hydroxyphenyl) sulfide is the same as that of FKOSOKF, except that the 1,4-bis(4-fluorobenzoyl) benzene is substituted for 4,4'-difluorophenone.

Synthesis scheme of FKKOSOKFF

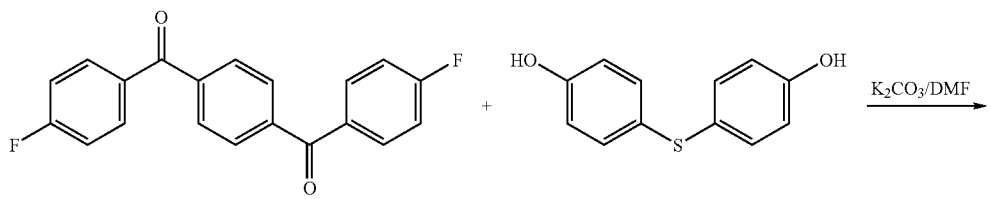

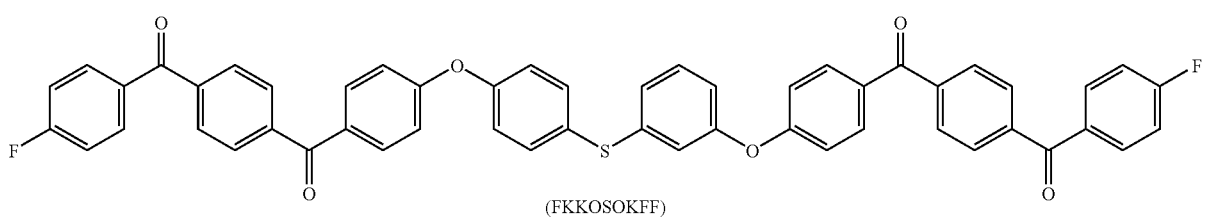

(FKKOSOKFF)

Synthesis of the Monomer

Next, a preferred embodiment is detailedly illustrated.

Into a 3,000 ml three-necked bottle equipped with mechanical stirrer, thermometer and oil-water separator, 4,4'-dihydroxydiphenyl sulfide (65.48 g, 0.30 mol) and 4,4'-di(4-fluorobenzoyl)benzene (322.30 g, 3.00 mol) are added, then N,N-dimethylformamide DMF (1,000 ml), anhydrous $K_2CO_3$ (96.75 g, 0.70 mol) and toluene (200 ml) are added. The system is reacted at 145-150° C. for 4-5 h under $N_2$ gas. Most solvent is removed by vacuum distillation. The residue is poured into distilled water (5,000 ml). After filtering, the obtained white solid is reflux-washed 6-8 times with xylene to remove the unreacted 4,4'-di(4-fluoro)-benzoyl benzene. Washed 6-8 times with boiling water to remove the inorganic salt. The obtained white powdered sample (FKKOSOKKF) is dried at 110-120° C. for 10-12 h. The yield is 96-98%.

In the present invention, $Na_2CO_3$ can be used to replace $K_2CO_3$ or be used together with $K_2CO_3$. The used solvent can be DMF, DMAc, NMP or mixtures thereof.

Synthesis of the Polymer

The present invention provides a process for preparing the polyaryletherketone, comprising the step of introducing 2.5-30 mol %, on the basis of the total mole numbers of FKOSOKF or FKKOSOKKF and the difluoromonomer, of FKOSOKF or FKKOSOKKF as a block into the main chain of PAEK by a nucleophilic substitution, wherein the step comprises:

a) heating and melting a difluoromonomer selected from a group consisting of 4,4'-difluorobenzophenone and 4,4'-(4-fluoro)-dibenzoyl benzene, a bisphenol monomer selected from a group consisting of paradioxybenzene and biphenyldiphenol, and diphenyl sulfone as the solvent, where the mole ratio of difluoromononer to diphenol monomer is 1:1;

b) adding a mixed salt catalyst obtained by mixing $K_2CO_3$ and $Na_2CO_3$ to step a);

c) reacting while stirring at 160-180° C. for 1-1.5 h, and further reacted for 1 h respectively at each of the elevated temperatures controlled at 220-230° C., 250-260° C., and 280-290° C.;

d) adding FKOSOKF or FKKOSOKKF;

e) further reacting at 310-315° C. for 1-3 h; and f) post-treating the resulting product in step e).

Next, a preferred embodiment is detailedly illustrated.

By the route of nucleophilic substitution, 2.5-30 mol %, on the basis of the total mole numbers of FKOSOKF or FKKOSOKKF and the difluoromonomer, of FKOSOKF or FKKOSOKKF, is introduced as a block into the main chain of PAEK. Suitable difluoromonomer for this invention is preferred as 4,4'-difluorobenzophenone and 4,4'-(4-fluoro)-dibenzoyl benzene. The mol ratio of bisphenol monomer (paradioxybenzene or biphenyldiphenol) to the total of FKOSOKF and difluoromonomer or the total of FKKO-SOKKF and difluoromonomer is 1:1. Diphenyl sulfone is used as solvent in a solid content of 20-30 wt %, and a mixed salt of $K_2CO_3$ and $Na_2CO_3$ (mol ratio 1:19) is used as catalyst (mol ratio of catalyst to bisphenol monomer is about 1:1) are used. Next, the reaction procedure is briefly described. After heat-melting 4,4'-difluorobenzophenone or 4,4'-(4-fluoro) dibenzoylbenzene, bisphenol monomer and diphenyl sulfone, the mixed salt catalyst ($K_2CO_3$ and $Na_2CO_3$) is added. The system is reacted with stirring at 160-180° C. for 1-1.5 h, and further reacted for 1 h respectively at each of the elevated temperatures controlled at 220-230° C., 250-260° C., and 280-290° C. Then FKO-SOKF or FKKOSOKKF is added. The system is further reacted at 310-315° C. for 1-3 h. The crude reaction product is discharged from cold water. The crude product is pulverized to produce a powdered crude product sample and the sample is washed 6-8 times with acetone to remove the organic solvent, and then the powdered crude product sample is washed 6-8 times with distilled water to remove the inorganic salt. The final product is dried at 110-120° C. for 10-12 h to obtain a white powdered polymer sample (yield 96-98%). The product is electron beam irradiated for 8-80 min at the irradiation dose of 100-1,000 kGy to obtain a series of cross-linked PAEK block copolymers having different cross-linking degrees. In addition, by regulating the concentration of fluoro terminal group to control the molecular weight, a polymer with an optimum molecular weight, improved performance and excellent processability can be obtained.

The structural formulas of the present polymers are as follows:

Formula I (examples 1, 2)

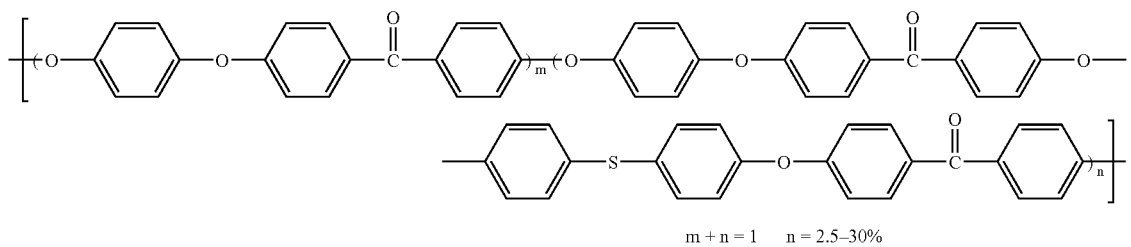

$m + n = 1 \quad n = 2.5–30\%$

Formula II (examples 3, 4)

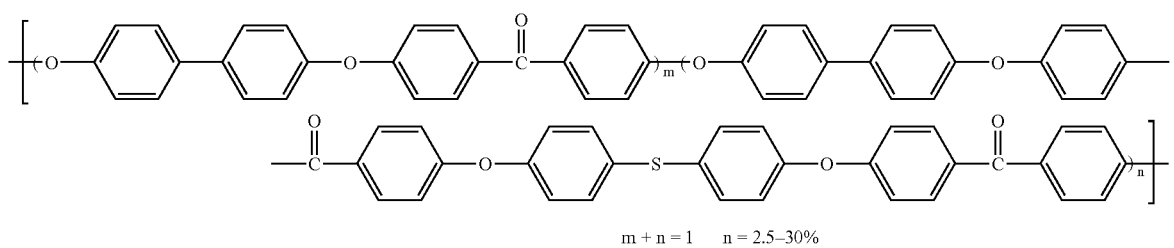

$m + n = 1 \quad n = 2.5–30\%$

Formula III (examples 5, 6)
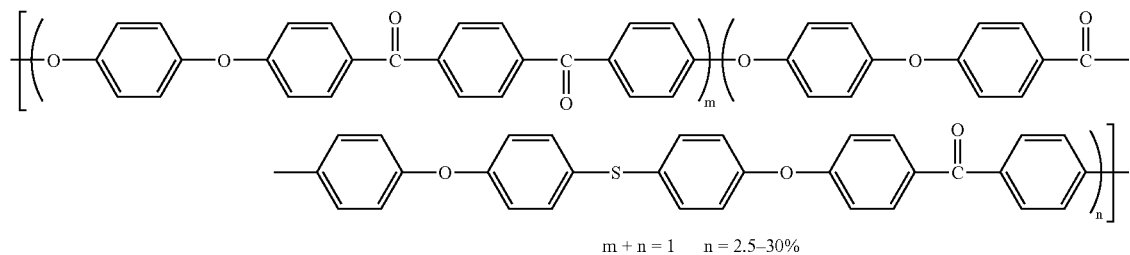
m + n = 1   n = 2.5–30%
Formula IV (examples 7, 8)
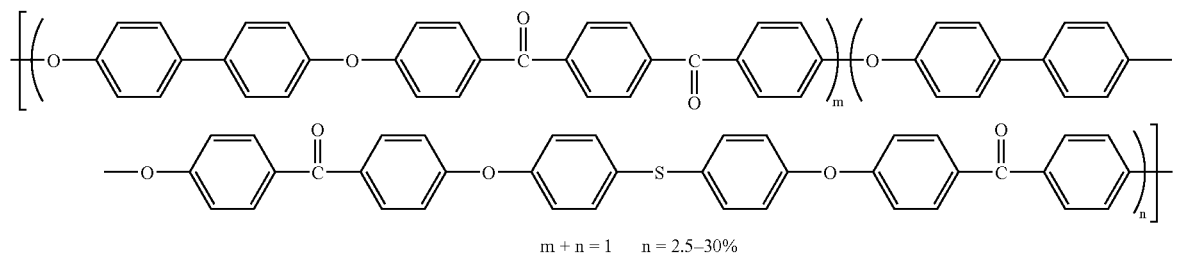
m + n = 1   n = 2.5–30%
Formula V (example 9)
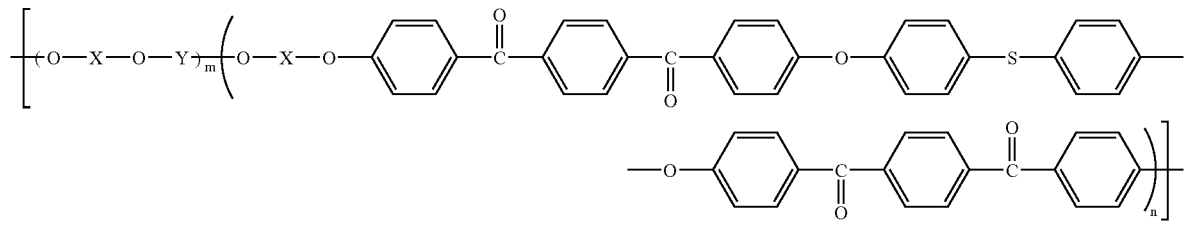
m + n = 1   n = 2.5–30%
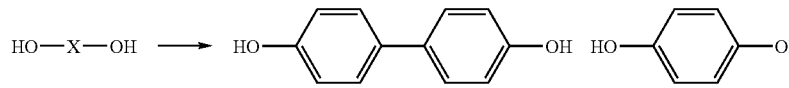
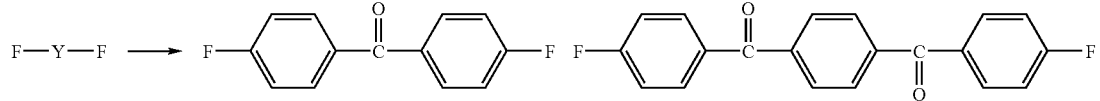
Synthesis scheme of the present polymer (examples 1, 2):
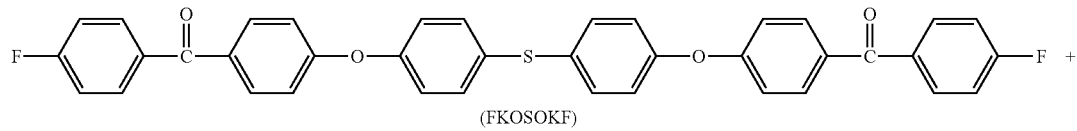
(FKOSOKF)
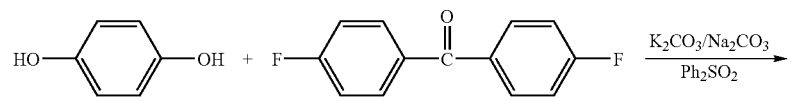
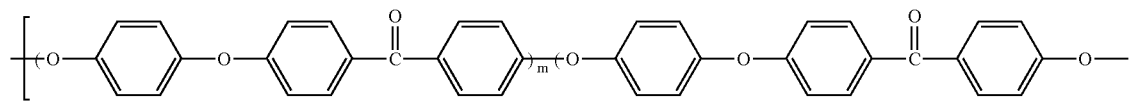

-continued
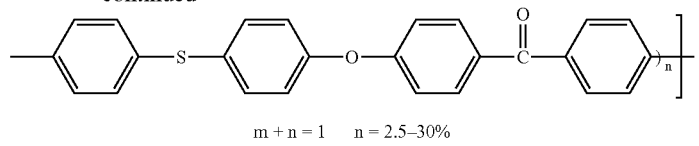
m + n = 1   n = 2.5–30%
Synthesis scheme of the present polymer (examples 3, 4):
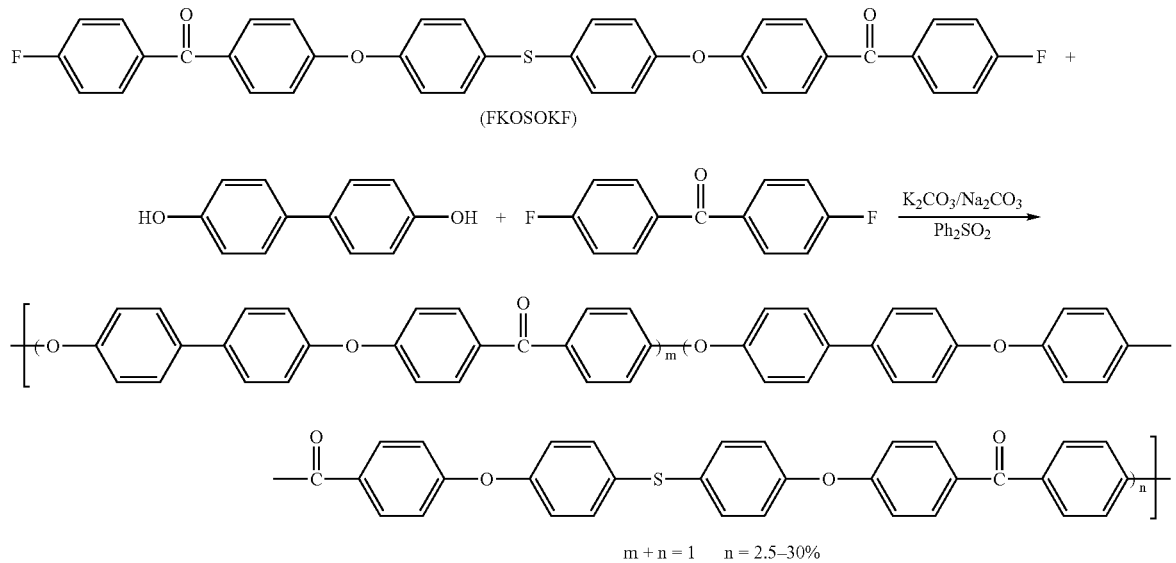
m + n = 1   n = 2.5–30%
Synthesis scheme of the present polymer (examples 5, 6):
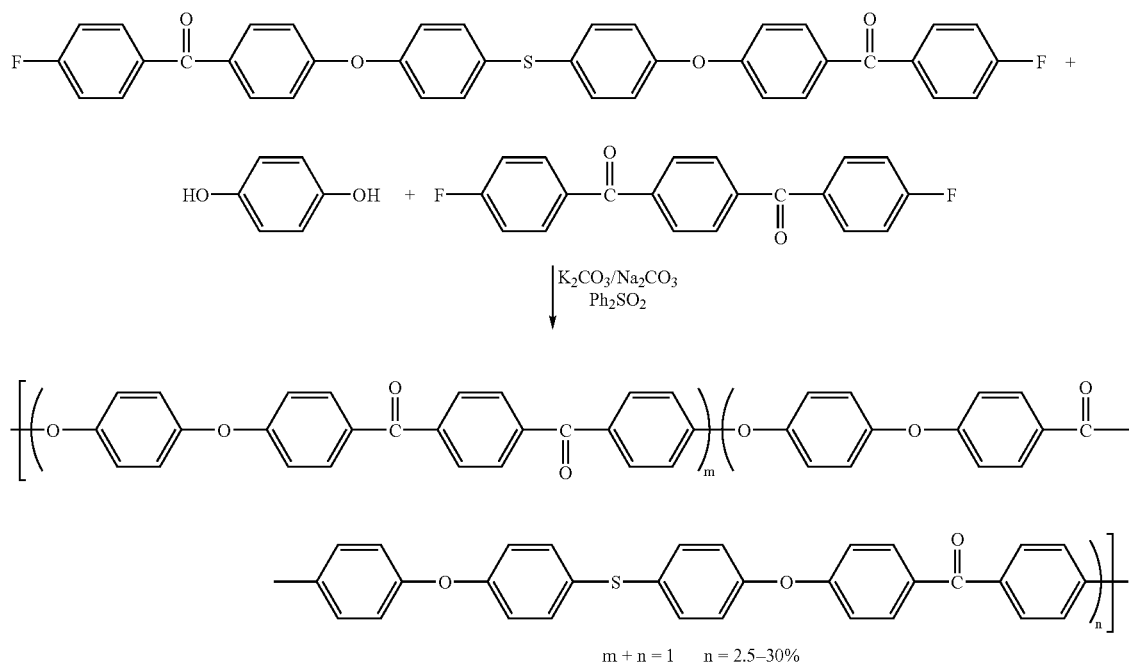
m + n = 1   n = 2.5–30%

Synthesis scheme of the present polymer (examples 7, 8):

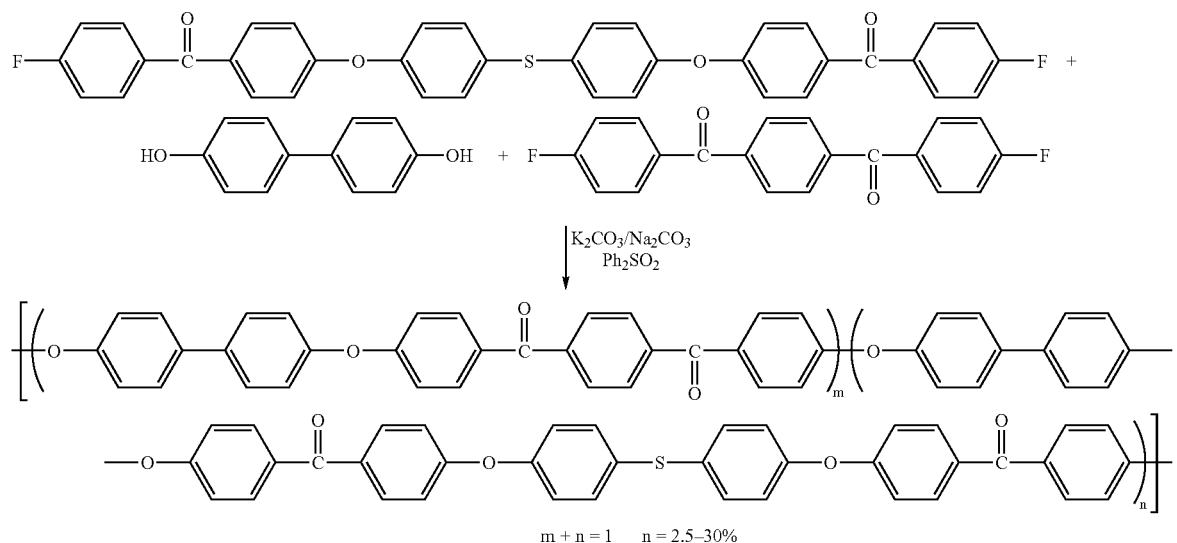

Synthesis scheme of the present polymer (example 9):

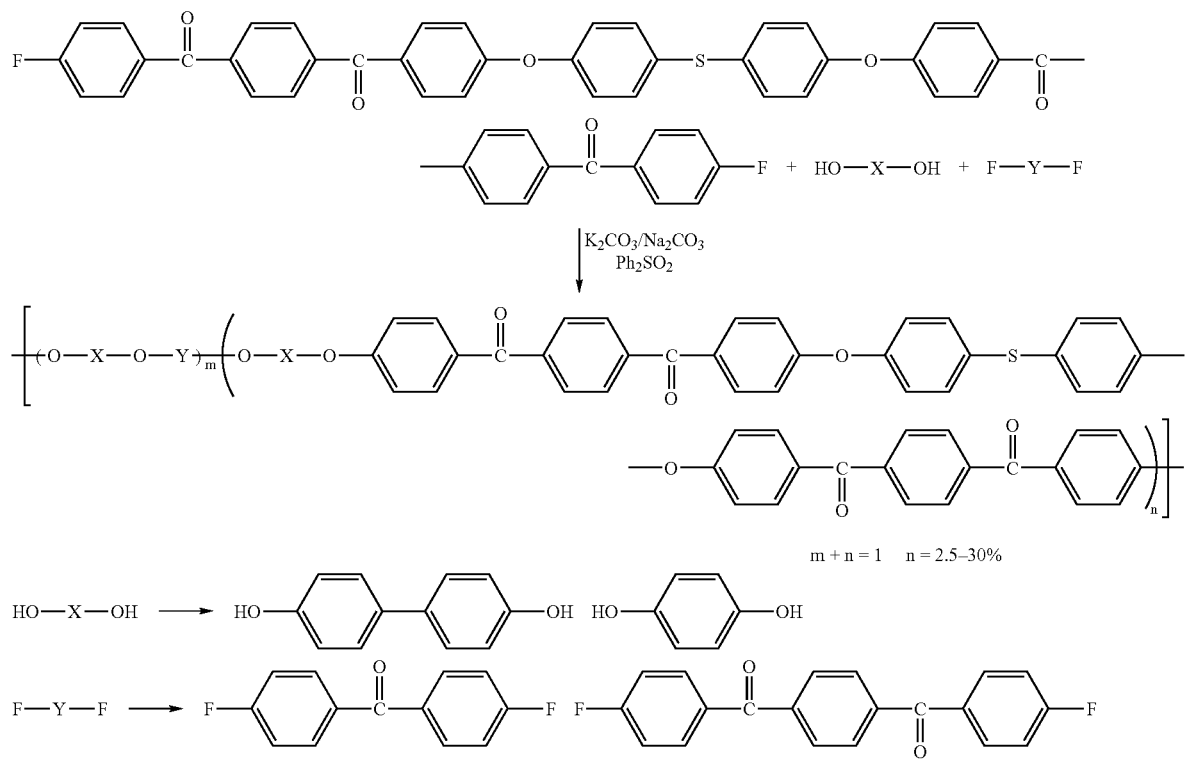

The controllable cross-linking polyaryletherketone material of high performance prepared by the method of this invention has the following outstanding advantageous.

1. The material performance is strongly influenced by the distribution pattern of the cross-linking points. The regular distribution of cross-linking points over the material is one of the very important factors for improving material performance. In the present invention, FKOSOKF or FKKOSOKKF is introduced into the main chain structure of PAEK by way of block copolymerization. As a result, the segment length of PAEK in the copolymer is essentially uniform, the cross-linking points are distributed singly and evenly in the polymer to form a regular cross-linked network structure, the cross-linking density is uniform and the structure and performance of the cross-linked material are controllable.

2. By changing the content of cross-linking points, the cross-linking density can be regulated and controlled. By controlling and regulating the cross-linking density, the structure and performance of material can be controlled and regulated, and the different application requirements are satisfied. The optimum content ranges between 2.5-30%. If the content of cross-linking points and the cross-linking density are too high, the mechanical performance will be deteriorated and the material such as PPS material will be brittle and can easily be ruptured. The content of cross-linking points can be controlled by changing the feed ratio between the monomers.

3. No degradation reaction takes place during the cross-linking reaction, and the structure and performance are stable.

4. Compared with FKOSOKF-containing block copolymer, the FKKOSOKKF-containing block copolymer has a high stiffness and a fairly high heat resistance after cross-linking.

EXAMPLE 1

Into a 1,000 ml three-necked bottle equipped with mechanical stirrer, thermometer, 4,4'-difluorobenzo phenone (42.549 g, 0.195 mol), paradioxybenzene (22.000 g, 0.200 mol) and diphenyl sulfone (200.000 g, 0.960 mol) were added under $N_2$. After heat-melting, anhydrous $K_2CO_3$ (1.421 g, 0.0103 mol) and anhydrous $Na_2CO_3$ (20.140 g, 0.190 mol) were added. The system was reacted with stirring at 160° C. for 1 h, and further reacted for 1 h at the elevated temperatures controlled respectively at 220° C., 250° C., and 290° C. Then the monomer compound FKOSOKF (3.061 g, 0.005 mol) was added. The system was reacted continuously at 310° C. for 1-3 h. The reaction product was discharged from cold water. The powdered crude product was washed 6 times with boiling acetone and boiling distilled water respectively to remove the organic solvent and inorganic salt. The final product was dried at 120° C. for 12 h, and a white powdered block copolymer sample was obtained (mol percent of FKOSOKF on the basis of total moles numbers of FKOSOKF and 4,4'-difluoro benzophenone: 2.5%; molecular weight: $3.2 \times 10^4$; yield: 97%).

EXAMPLE 2

Example 2 was carried out as the same manner as that of example 1, except that the mol percent of FKOSOKF was changed successively to 5%, 10%, 15%, 20%, 25% and 30%. After treating as in example 1, the white powdered block copolymer samples were obtained (mol percent of FKOSOKF 5%, 10%, 15%, 20%, 25% and 30%, yield 96%-98%).

EXAMPLE 3

Into a 1,000 ml three-necked bottle equipped with mechanical stirrer and thermometer, 4,4'-difluoro benzophenone (42.549 g, 0.195 mol), biphenyldiphenol (37.200 g, 0.200 mol) and diphenyl sulfone (220.000 g, 1.068 mol) were added under $N_2$. The system was reacted with stirring at 180° C. for 1 h, and further reacted for 1 h at each of the elevated temperatures controlled respectively at 220° C., 250° C. and 290° C. Then the monomer FKOSOKF (3.061 g, 0.005 mol) was added. The system was further reacted at 320° C. for 3 h. The reaction product was discharged from cold water. The powdered crude product was washed 6 times respectively with boiling acetone and boiling distilled water to remove the organic solvent and inorganic salt. The final product was dried at 120° C. for 12 h, a white powdered block copolymer sample was obtained (mol percent of FKOSOKF 2.5%, yield 98%).

EXAMPLE 4

Example 4 was carried out in the same manner as that of example 3, except that the mol percent of FKOSOKF was changed successively to 5%, 10%, 15%, 20%, 25% and 30%. After treating as in example 3, the white powdered block copolymer samples were obtained (mol percent of FKOSOKF: 5%, 10%, 15%, 20%, 25% and 30%; yield: 98%).

EXAMPLE 5

Into a 1,000 ml three-necked bottle equipped with a mechanical stirrer and a thermometer, 1,4-bis(4-fluorobenzoyl) benzene (62.595 g, 0.195 mol), paradioxybenzene (22.000 g, 0.200 mol), diphenyl sulfone (200.000 g, 1.068 mol) were added. After heat-melting, anhydrous $K_2CO_3$ (1.421 g, 0.0103 mol) and anhydrous $Na_2CO_3$ (20.140 g, 0.190 mol) were added. The system was reacted with stirring at 180° C. for 1 h, and further reacted for 1 h at the elevated temperatures controlled respectively at 220° C., 250° C., and 290° C. Then the monomer compound FKOSOKF (3.061 g, 0.005 mol) was added. The system was further reacted at 320° C. for 3 h. The reaction product was discharged from cold water. The powdered crude product was washed respectively with acetone and distilled water to remove the organic solvent and inorganic salt. The final product was dried at 120° C. for 12 h, and then a white powdered block copolymer sample was obtained (mol percent of FKOSOKF: 2.5%; yield: 97%). Compared with the structure of example 1,4,4'-difluorobenzophenone unit was substituted by 1,4-bis(4-fluorobenzoyl) benzene unit.

EXAMPLE 6

Example 6 was carried out in the same way as that of example 5, the mol percent of FKOSOKF was changed successively to 5%, 10%, 15%, 20%, 25% and 30%. After treating as example 5, the white powdered block copolymer samples were obtained (mol percents of FKOSOKF: 5%,10%, 15%, 20%, 25% and 30%; yield: 97%).

EXAMPLE 7

Into a 1,000 ml three-necked bottle equipped with mechanical stirrer and thermometer, 1,4-bis(4-fluorobenzoyl) benzene (62.595 g, 0.195 mol), biphenyldiphenol (37.200 g, 0.200 mol), diphenyl sulfone (250.000 g, 1.214 mol) were added. Anhydrous $K_2CO_3$ (1.421 g, 0.0103 mol) and anhydrous $Na_2CO_3$ (20.140 g, 0.190 mol) were added. The system was reacted under stirring at 180° C. for 1 h, and further reacted for 1 h at each of the elevated temperatures controlled respectively at 220° C., 250° C. and 290° C. Then the monomer compound FKOSOKF (3.061 g, 0.005 mol) was added. The system was further reacted at 320° C. for 3 h. The reaction product was discharged from cold water. The powdered crude product was washed respectively with acetone and distilled water to remove the organic solvent and inorganic salt. The final product was dried at 120° C. for 12 h, a white powdered block copolymer sample was obtained (mol percent of FKOSOKF: 2.5%; yield: 97%). Compared with example 1, in the structural of polymer, 4,4'-difluorobenzophenone unit was substituted by 1,4-bis (4-fluorobenzoyl) benzene unit, and paradioxybenzene unit was substituted by biphenyldiphenol unit.

EXAMPLE 8

Example 8 was carried out in the same way as that of example 7, except that the mol percent of FKOSOKF was changed successively to 5%, 10%, 15%, 20%, 25% and 30%. After treating as example 7, white powdered block copolymer samples were obtained (mol percents of FKOSOKF: 5%, 10%, 15%, 20%, 25% and 30%; yield: 97%).

EXAMPLE 9

Example 9 was carried out in the same way as that of examples 1-8, except that FKOSOKF was substituted by FKKOSOKKF, difluoromonomer was 4,4'-difluorobenzophenone or 1,4-bis(4-fluorobenzoyl) benzene, bisphenol monomer was paradioxybenzene or biphenyldiphenol. A series of new type controllable crosslinking polyaryletherketone block copolymer materials having improved performance were obtained (mole percents of FKKOSOKKF: 2.5%, 5%, 10%, 15%, 20%, 25%, 30%; molecular weight: about 30,000; yield: 96-98%).

EXAMPLE 10

The block copolymers prepared in examples 1-9, with different contents of cross-linking points (2.5%, 5%, 15%, 20%, 25%, 30%), were cross-linked by electron beam irradiation (irradiation dose: 100 kGy; irradiation time: 8 min), a series of cross-linked PAEK block copolymers with different cross-linking degrees were obtained.

EXAMPLE 11

Example 11 was carried out in the same way as that of example 10, except that the block copolymers prepared in example 1-9, with different contents of cross-linking points (2.5%, 5%, 15%, 20%, 25%, 30%), were cross-linked by electron beam irradiation in different irradiation doses ranging from 150 kGy to 1,000 kGy (irradiation time 12-80 min). A series of crosslinked PAEK block copolymers with different cross-linking degrees were obtained.

Test Experiments:

The thermal properties of the present block copolymer (with 5 mol % of FKOSOKF) obtained in example 2 are determined using a Mettler-Toledo DSC821$^e$ DSC(Differential Scanning Calorimeter, made in Swiss) under the following conditions: standard In, Zn corrected temperature and heat flow value; temperature, 50-400° C.; rate of rise, 20° C./min; under nitrogen gas with a flow of 200 ml/min; and determined using a TGA-7 type high temperature calorimeter (Perkin-Elmer Corp. USA) under the following conditions: test temperature, 100-650° C.; rate of rise, 20° C./min; under nitrogen gas with a flow of 40 ml/min. The test results are listed in table 1.

TABLE 1

The thermal properties of the present block copolymer which cross-linking points (FKOSOKF) is 5% (before and after cross-linking)

| η(dl/g) | $M_w$ | Tg(° C.) | Tm(° C.) | $T_{D1}$(° C.) | $T_{D2}$(° C.) |
|---|---|---|---|---|---|
| 0.82 | 33720 | 143 | 342 | 546 | 563 |

$T_{D1}$: TGA before cross-linking
$T_{D2}$: TGA after cross-linking

The invention claimed is:

1. A controllable crosslinking polyaryletherketone as shown by any one of the following structures:

(I)

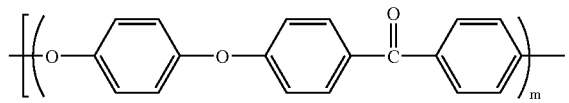

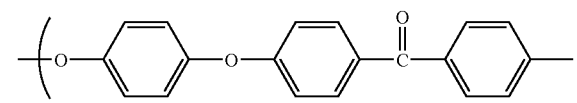

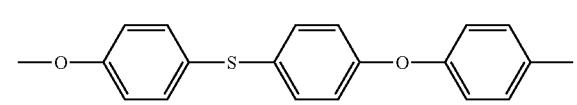

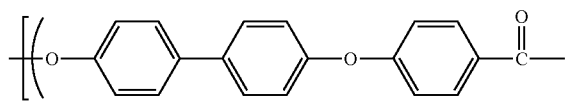

m + n = 1   n = 2.5-30%

(II)

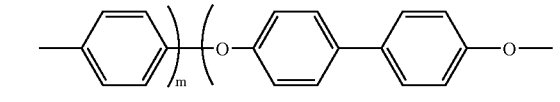

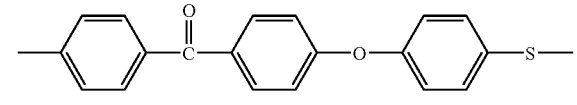

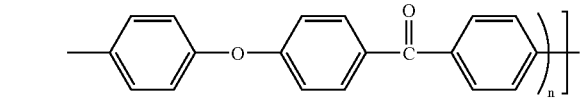

m + n = 1   n = 2.5-30%

(III)

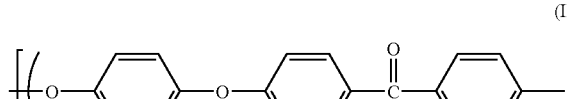

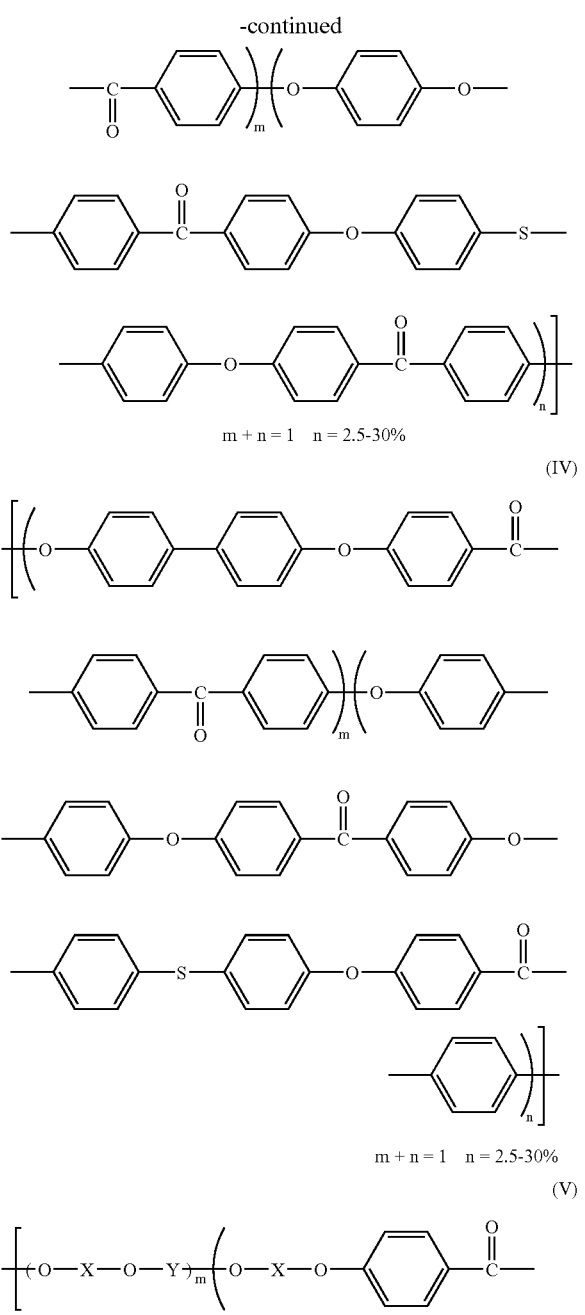
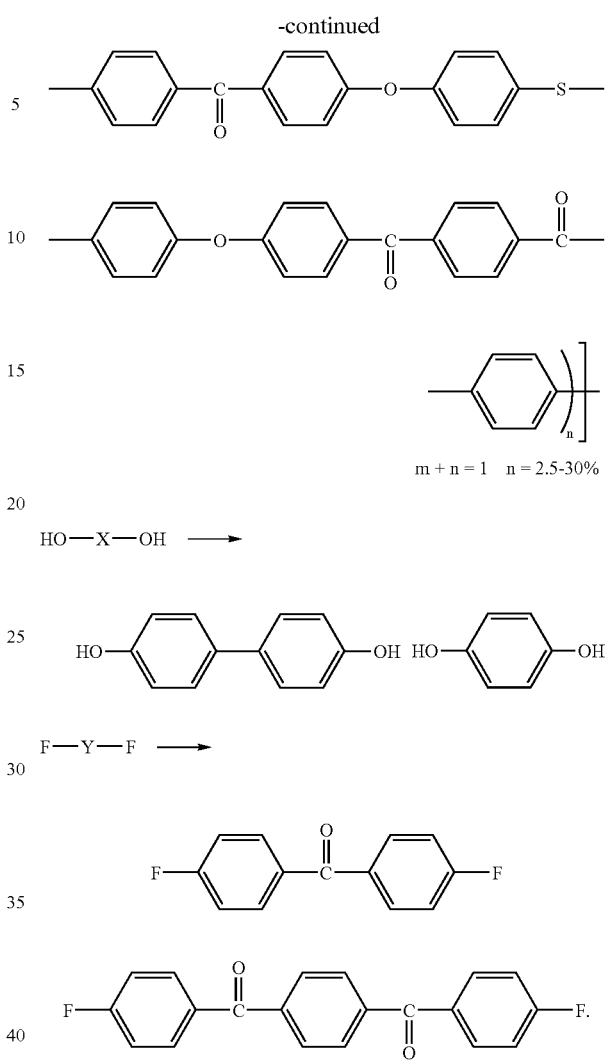
2. The polyaryletherketone as claimed in claim 1, wherein the main chain of the polyaryletherketone comprises thioether structures as blocks, and each chain segment of the polyaryletherketone between crosslinking points uniformly distributed in the main chain of the polyaryletherketone are of the same length.
* * * * *